Patented Aug. 3, 1937

2,088,577

UNITED STATES PATENT OFFICE 2,088,577

CHEMICAL PROCESSES AND PRODUCTS RESULTING THEREFROM

Rollin F. Conaway, Wilmington, Del., assignor to E. I. du Pont de Nemours & Company, Wilmington, Del., a corporation of Delaware No Drawing. Application December 27, 1932
Serial No. 648,995

6 Claims. (Cl. 49—81)

This invention relates to the preparation of soluble vinyl-type polymers of alpha, beta-unsaturated ketones. The invention also relates to the utility of these polymers in the various arts.

This invention has as an object the polymerization of alpha, beta-unsaturated ketones, and particularly of methyl vinyl ketone to form soluble vinyl-type polymers. The invention has as a further object the polymerization of this class of ketones in the presence of oxidizing catalysts such as ozone, organic peroxides, or compounds liberating oxygen on decomposition by heat and/or light. A further object of the invention resides in the use of the aforesaid polymers in the adhesive, impregnating, coating and molding arts. Other objects will appear hereinafter.

POLYMERIZATION OF ALPHA, BETA-UNSATURATED KETONES

Monomeric methyl vinyl ketone (or alpha, beta-unsaturated ketones in general) can be polymerized alone or in the presence of other polymerizable or non-polymerizable materials either in the presence or absence of solvents to yield soluble vinyl-type polymers which are transparent and elastic.

The following examples illustrate preferred processes of carrying out this polymerization. Examples 1 and 2 illustrate the process of polymerizing methyl vinyl ketone in solution.

EXAMPLE 1

5% of benzoyl peroxide used as a catalyst

Composition:

| | Parts by weight |
|---|---|
| Methyl vinyl ketone ($CH_2=CH-C=O$)—$CH_3$ | 100 |
| Ethyl acetate | 100 |
| Benzoyl peroxide | 5 |

Temperature=75° C.
Time=3 hours.
Per cent polymerization=96.5.

This polymerization was carried out by heating the solution of methyl vinyl ketone and ethyl acetate in the presence of the benzoyl peroxide, in a vessel fitted with a water-cooled reflux condenser. The vessel, which was immersed in a water bath at 75° C., was shaken from time to time during the polymerization. The degree of polymerization was determined by removing the volatile constituents and weighing the non-volatile polymer. The polymerization was practically complete in three hours. The solution was transferred to a steam heated mixer of the Werner-Pfleiderer type and was therein heated and mixed until all the ethyl acetate had evaporated. Mixing and heating for an additional hour removed all the odorous material from the polymer. The odor-free, light brown resin was readily soluble in ketones and esters.

The effect of the amount of catalyst is illustrated by Example 2.

EXAMPLE 2

2% of benzoyl peroxide used as a catalyst

Composition:

| | Parts by weight |
|---|---|
| Methyl vinyl ketone | 100 |
| Ethyl acetate | 100 |
| Benzoyl peroxide | 2 |

Temperature=75° C.
Time=6 hours.
Per cent polymerization=96%.

The same procedure was employed in this case as described above in Example 1. In this example, however, in which only 2% of benzoyl peroxide was employed, six hours of heating were required for the polymerization to become practically complete. The polymer was soluble in organic solvents.

EXAMPLE 3

Polymerization in the absence of a solvent

Composition:

| | Parts by weight |
|---|---|
| Methyl vinyl ketone | 6000 |
| Benzoyl peroxide | 6 |

Temperature=75° C. until polymerization became active.
Time for polymerization to become practically complete=3 hours.

The polymerization of alpha, beta-unsaturated ketones is an exothermic reaction so that in the preparation of solid polymers as distinct from the polymers obtained by polymerization in solution the reaction mass usually has to be cooled after the polymerization becomes active in order to control the reaction.

The polymerization described in Example 3 was carried out by dissolving the benzoyl peroxide in the monomeric methyl vinyl ketone and heating the resulting solution in a reaction vessel fitted with a water-cooled reflux condenser. The vessel, which was immersed in a water bath at a temperature of 75° C., was shaken from time to time until the polymerization became active which usually required from forty minutes to an hour. As soon as the polymerization became active which was indicated by a rapid rise in temperature and violent bubbling of the solution, the hot water bath was replaced by an ice bath. The ice bath was removed as soon as the reaction was cooled sufficiently so that the polymerization would continue at room temperature. It usually required approximately three hours for the material to become a hard, transparent elastic mass. At the end of three hours this hard polymer still possessed a slight irritating odor due to the presence of a small amount of monomer. The polymer was left in the flask overnight and then allowed to stand in the sunlight for a day to permit the small amount of monomeric material to evaporate or polymerize. The resulting clear, transparent, elastic, solid was odorless and soluble in acetone, ethyl acetate, ether alcohols such as β-ethoxyethanol and mixtures of alcohol and toluene.

EXAMPLE 4

*Polymerization in the presence of ozone as a catalyst*

Composition:

| | Parts by weight |
|---|---|
| Methyl vinyl ketone | 100 |
| Monomethyl ether of ethylene glycol | 100 |

Ozone, prepared by an ozonizer, was slowly passed into the methyl vinyl ketone solution, at 50° C., for three hours. Since there was no apparent polymerization of the methyl vinyl ketone, the resulting solution was heated for three hours at 75° C. Polymerization was practically complete after three hours of heating at 75° C. This polymer resembled the other solution polymers of methyl vinyl ketone in that it was homogeneous, transparent, produced clear, tough films, and was soluble in organic solvents.

EXAMPLE 5

*Polymerization of methyleneethyl methyl ketone*

Methyleneethyl methyl ketone

does not polymerize as readily as methyl vinyl ketone but the following example illustrates the effect of catalysts on the rate of polymerization of this unsaturated ketone.

Composition:

| | Parts by weight |
|---|---|
| Methyleneethyl methyl ketone | 250 |
| Benzoyl peroxide | 5 |

Heating schedule—
 6 hours at 90° C. (no apparent change)
 8 hours at 90° C. (no apparent change)
 8 hours at 125° C. (started to polymerize)
 8 hours at 125° C. (viscous liquid)
 8 hours at 125° C. (hard transparent solid)
 38 hours (hard transparent solid)

The resulting polymer was odorless and soluble in acetone and ester solvents.

EXAMPLE 6

*Polymerization in the presence of light as a catalyst*

230 grams of methyl vinyl ketone were placed in a 500 cc. reaction flask and exposed to sunlight for two days. The resulting product was a hard, elastic, transparent solid which was soluble in acetone and ester solvents. The intensity of the light influences the speed of polymerization for on a cloudy day the rate of polymerization is very slow. The influence of heat, light and oxygen on the rate of polymerization is also demonstrated by the fact that a sample of methyl vinyl ketone can be preserved in a monomeric state for several days by blanketing the sample with carbon dioxide and placing it in a cold, dark storage room.

It has been stated that suitable catalysts for polymerizing methyl vinyl ketone and its analogous ketones are light, ozone, organic peroxides, and compounds which liberate oxygen on decomposition. The preferred catalysts which are considered most suitable for the reaction are the organic peroxides. This class of catalysts is typified by benzoyl peroxide, acetyl peroxide, ozonized turpentine, and the like.

The preferred method of polymerizing alpha, beta-unsaturated ketones is to heat the pure monomeric material alone, or in the presence of other constituents at a temperature near the boiling point of the monomer in the presence of a small amount of benzoyl peroxide.

The polymerization may be carried out in a batch process, a continuous system or by a two-phase semi-continuous system. In the two-phase system the monomer is allowed to enter the polymerization chamber at a constant rate and the semi-polymerized material removed at a constant rate and allowed to completely polymerize in another chamber. The continuous process is particularly adapted to polymerization in solution for the conditions governing polymerization can be controlled with a greater degree of accuracy than in a batch process. Due to this fact, solution polymers prepared by a continuous process frequently possess different solubility characteristics than polymers prepared by a batch process.

The small amount of monomeric material which is usually removed by exposing the solid polymer to sunlight for a few hours can also be removed by washing or extracting with a solvent in which the monomer is soluble and the polymer insoluble, or by distilling in the presence of a carrier liquid, such as benzene, water, etc. Another satisfactory manner of removing monomeric material from the polymer is to roll the solid polymer on warm rolls or to treat its solution in a heated vacuum mixer of the Werner-Pfleiderer type until all volatile material is removed.

The solution polymers, especially of methyl vinyl ketone, possess a sharp irritating odor due to the presence of a small amount of unpolymerized material. The unpolymerized material is much more difficult to remove from solution polymers than from the solid polymers. The best methods of removing the unpolymerized material from solution polymers are: (1) blowing the solution with air; (2) vacuum distillation of the solution or an equivalent treatment in a Werner-Pfleiderer mixer; and (3) precipitation of the polymer with a non-solvent such as alcohol and resolution of the precipitate in pure solvents.

The vinyl type polymer of methyl vinyl ketone prepared by the present process is soluble in acetone, esters, ether alcohols, dioxan and mixtures of ethyl alcohol and toluene. It is insoluble in water, ether, alcohols, and hydrocarbons. Solutions of the solid polymer possess very high viscosities. The solution polymers possess much lower viscosities than equal concentrations of solutions of the solid heat polymer.

Acids discolor the polymer badly. The addition of alkalies to a solution of the polymer precipitates the polymer. This precipitated polymer is brittle and insoluble in all solvents. Neutral polymerization conditions are therefore preferred.

The vinyl-type polymer of methyl vinyl ketone is compatible with pyroxylin, toluenesulfonamide resins, oil soluble phenol-formaldehyde resins, triglyceryl phthalate, and dibutyl phthalate.

The index of refraction of polymerized methyl vinyl ketone is approximately 1.500 and the polymer is extremely transparent.

At ordinary room temperature the resin is hard but when heated to 60-70° C. it becomes plastic and extremely elastic. On further heating at higher temperatures it decomposes before it becomes a liquid. On cooling to —10° C. it becomes very hard and retains its toughness.

Films of this polymer adhere to glass, wood and metal extremely well and possess excellent light stability. After six months' exposure to sunlight no apparent discoloration of the films could be detected.

The alpha, beta-unsaturated ketones to which the present invention pertains can be polymerized in the presence of other polymerizable materials with a considerable modification of the properties of the polymer. Copolymerization or interpolymerization is illustrated in the following examples:

EXAMPLE 7

*Interpolymerization with vinyl chloride*

Composition:
 300 parts by weight of methyl vinyl ketone
 100 parts by weight of vinyl chloride
 200 parts by weight of butyl acetate
 5 parts by weight of benzoyl peroxide
 80 parts by weight of ethylene oxide
 Temperature=100° C.
 Time=4 hours This polymerization was carried out by sealing the above components in a pyrex tube and heating in a bomb furnace at 100° C. for four hours. The resulting polymer was soluble in organic solvents. Films of this interpolymer were clear, and were tougher and more elastic than polymers of pure methyl vinyl ketone.

EXAMPLE 8

*Interpolymerization with vinyl acetate*

Composition:
 341 parts by weight of methyl vinyl ketone
 113 parts by weight of vinyl acetate
 1 part by weight of benzoyl peroxide
 Temperature=75° C.
 Time=5 hours This interpolymer was prepared by heating the components listed above in a reaction vessel, fitted with a water-cooled reflux condenser, at 75° C., in a water bath for five hours. The resulting hard, transparent polymer was softer and more elastic than polymers of methyl vinyl ketone, and did not possess the sharp irritating odor which is characteristic of freshly prepared polymers of methyl vinyl ketone. This interpolymer was soluble in organic solvents.

EXAMPLE 9

*Continuous interpolymerization with vinyl chloride*

Composition:
 975 parts by weight of acetone
 802 parts by weight of vinyl chloride
 653 parts by weight of methyl vinyl ketone
 25 parts by weight of ethylene oxide
 45 parts by weight of benzoyl peroxide This mixture was passed through an eight-foot lead-lined reaction tube at a rate of about 500 cc. per hour, at a temperature of 110-115° C., and at a pressure of 500 pounds per square inch furnished by nitrogen gas. The exit gases were bled off through a needle valve and condensed by means of solid carbon dioxide. The dissolved resin represented a 14% yield and contained 13% of polyvinyl chloride. The solution when flowed over glass gave light brown, transparent films.

A number of other interpolymers of methyl vinyl ketone were prepared using benzoyl peroxide as the catalyst with styrene and/or esters of acrylic acid. The interpolymer with styrene was extremely hard and tough.

The alpha, beta-unsaturated ketones may also be polymerized in the presence of non-polymerizable materials which interact with the vinyl ketones to modify the properties of the final polymers. (This is termed cross-polymerization.)

The following examples present illustrations of this type of polymerization:

EXAMPLE 10

*Polymerization with toluenesulfonamide-formaldehyde resins*

Composition:
 80 g. of methyl vinyl ketone
 20 g. of p-toluenesulfonamide - formaldehyde resin
 0.2 g. of benzoyl peroxide
 Temperature=75° C.
 Time=4 hours The p-toluenesulfonamide was dissolved in the methyl vinyl ketone and the resulting solution polymerized by heating for four hours at 75° C. in the presence of the benzoyl peroxide. The resulting polymer was homogeneous, hard, and soluble in organic solvents.

EXAMPLE 11

*35% modified linseed oil, polyhydric alcohol-polybasic acid resins*

Composition:
 75 g. of methyl vinyl ketone
 25 g. of resin A
 0.75 g. of benzoyl peroxide
 Temperature=75° C.
 Time=6 hours Resin A of the above example was prepared by heating together:

| | Parts by weight |
|---|---|
| Glycerol | 23.1 |
| Phthalic anhydride | 46.2 |
| Linseed oil acids at 200–250° until resinification took place | 30.7 |

This polymer was prepared in the same manner as described in the preceding example. The resulting hard resin was soluble and compatible with drying oils, while mixtures of the modified linseed oil resin and polymers of methyl vinyl ketone are more or less incompatible.

The formation of interpolymers and crosspolymers can be extended to other alpha, beta-unsaturated ketones. Methyl vinyl ketone and related alpha-beta unsaturated ketones can also be polymerized in the presence of a softener such as dibutyl phthalate to give a soft elastic, soluble product.

This invention embraces soluble vinyl-type polymers of alpha, beta-unsaturated ketones, containing at least four carbon atoms and containing at least one and preferably two hydrogen atoms on the beta carbon atom. These ketones can be expressed by the formula

$$HCR_1=CR_2-CO-R_3$$

where $R_3$ is a hydrocarbon radical and $R_1$ and $R_2$ are hydrogen or hydrocarbon radicals. Thus there may be obtained soluble vinyl-type polymers of phenyl vinyl ketone, methyl vinyl ketone, hexyl vinyl ketone, cyclohexyl vinyl ketone, divinyl ketone, allyl vinyl ketone, methyl isopropenyl ketone, 1,3-butadienyl methyl ketone, 1,3-butadienyl naphthyl ketone, vinyl bi-phenyl ketone, amyl vinyl ketone, ethyl vinyl ketone, butyl vinyl ketone, propyl vinyl ketone, etc. However, alpha, beta-unsaturated ketones which contain an unsubstituted methylene group ($=CH_2$) as in methyl vinyl ketone, ($CH_2=CH-CO-CH_3$), polymerize more readily than do those ketones which contain a substituted methylene group as in ethyldeneacetone ($CH_3-CH=CH-CO-CH_3$).

There are several methods of modifying the properties of the soluble vinyl-type polymer of methyl vinyl ketone. The viscosity of solutions of the solid polymer can be greatly decreased by rolling the solid polymer on heated rolls from one to two hours. The viscosity of the polymer can also be decreased by polymerizing the methyl vinyl ketone in solution. An alternative procedure to milling the polymer on warm rolls consists in dissolving the polymer in a solvent or in directly polymerizing the monomer in the solvent, and then mixing the solution in a steam heated mixer of the Werner-Pfleiderer type. The solvent if low boiling like acetone will evaporate at atmospheric pressure but if a high boiling solvent is used it may be necessary to remove the solvent by means of vacuum. After the solvent has been removed the resin is sufficiently soft to permit the hot mixer to continue to operate. After processing for a time the resin becomes harder and its solutions are of a lower viscosity.

Another method of altering the physical properties of the polymers of alpha, beta-unsaturated ketones is to mix them in varying proportions with cellulose derivatives such as cellulose acetate, cellulose nitrate or ethyl cellulose; with natural resins or gums for example damar, rosin, or shellac; with synthetic resins such as phenol-formaldehyde, polyhydric alcohol-polybasic acid, urea-formaldehyde, or vinyl resins; with softeners or placticizers for example camphor, aryl phosphates or alkyl phthalates; with bituminous materials, tars, or pitches; with waxes; with natural or synthetic rubber; with proteins such as glue or gelatin; with drying oils, or their acids such as China wood; with semi-drying oils (cottonseed) or their acids; with non-drying oils (castor) or their acids and with mineral oils. Polymers with wide variations in their physical properties may also be made by polymerizing the unsaturated ketones in the presence of the above mentioned materials. Products with desirable physical properties may also be obtained by polymerizing the unsaturated ketones with other polymerizable materials such as vinyl acetate, vinyl chloride, styrene, butadiene derivatives and esters of acrylic acid. (See Examples 7 to 9.) Any physical property such as hardness, toughness, solubility, index of refraction, compatibility, etc., may be modified by the presence of another material during the polymerization.

Still another method of altering the properties of the polymer is to modify chemically the ketone group in the resin. For example, the resin can be rendered completely infusible if treated with alkali, preferably in the presence of water. By suitably controlling the amount of alkali and the temperature varying proportions of fusible and infusible polymers may be obtained. Similarly the vinyl type polymer may be rendered partly or wholly infusible by reaction with para-formaldehyde, preferably in the presence of a small amount of alkali, with an aqueous solution of formaldehyde or with hexamethylene tetramine.

The temperature of polymerization at atmospheric pressure can be varied up to the boiling point of the monomer and experiment indicates that the process is more efficient at temperatures near the boiling point of the monomer. Polymerization in the presence of a catalyst proceeds much more slowly at low temperatures, for example 0° C. than at temperatures near the boiling point of the monomeric unsaturated ketone. Polymerization is readily carried out in closed vessels at temperatures up to 150° C. and these higher temperature polymers are of interest in that their solutions have a lower viscosity than corresponding solutions of low temperature polymers. Probably any temperature below the critical temperature for methyl vinyl ketone, which is unknown, is satisfactory for polymerization.

This process of polymerizing alpha, beta-unsaturated ketones may be operated under reduced pressure, at atmospheric pressure, or under increased pressure. Since the polymerization is accompanied by a decrease in volume an increase in pressure increases the rate of polymerization. For example at 40° C. and under 5500 atmospheres pressure 94% polymerization is obtained in 16 hours.

The concentration of catalysts depends on the type of catalyst employed and the nature of the solution being polymerized. When compounds which liberate oxygen on decomposition, such as organic peroxides, are used as catalysts the concentration may be varied up to the solubility of the catalyst in the monomeric solution. In the polymerization of pure monomeric materials using benzoyl peroxide as the catalyst the best results were obtained with concentrations of catalyst varying between 0.1 and 2.0%. In the preparation of solution polymers the concentration of benzoyl peroxide can be increased to as much as 10% without undesirable results. In the polymerization of methyl vinyl ketone using light as a catalyst, ultra-violet light having a wave-length of about 3130 Angstrom units is the most efficient but light of various wave-lengths such as sunlight also has a catalytic effect. Catalysts such as uranyl salts may also be used in the polymerization of methyl vinyl ketone by means of light.

Catalysts for this process of polymerizing alpha, beta-unsaturated ketones embrace compounds which liberate oxygen on decomposition by heat and/or light. Examples of such compounds are organic peroxides typified by acetyl peroxide, benzoyl peroxide, toluyl peroxide, palmityl peroxide, and peracids such as peracetic acid and perbenzoic acid. Ozone, ozonides, ozonized turpentine and inorganic peroxides such as barium peroxide and hydrogen peroxide are also catalysts.

In the preparation of solution polymers the concentration of the solvent may be varied within wide limits. In general, the greater the concentration of the solvent the more the concentration of the catalyst should be increased. While ketones and esters are the preferred solvents, large proportions of non-solvents such as gasoline or toluene may be used in conjunction with an ester without precipitating the polymer. Polymers of methyl vinyl ketone are even soluble in a mixture of alcohol and toluene both of which when used alone are non-solvents for the polymer.

In the preparation of interpolymers the concentration of the added material may be varied greatly, depending in most cases on the compatibility of the resulting product and the type of product desired.

Soluble vinyl type polymers of alpha, beta-unsaturated ketones refer to those polymers made with catalysts which liberate oxygen on decomposition by heat and/or light. Polymers made in the presence of alkali are not soluble in organic solvents and therefore are not considered vinyl type polymers. The soluble vinyl type polymers of methyl vinyl ketone probably have the structure

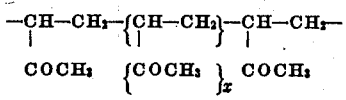

where $x$ may be any number but this formula is only illustrative and is not meant to be restrictive.

The advantages of this process are: (1) the use of catalysts, such as benzoyl peroxide, decreases the time of polymerization from a period of several days to a few hours; (2) the polymers obtained by this process are soluble in organic solvents; (3) the polymerization of alpha, beta-unsaturated ketones in the presence of solvents, or other polymerizable and non-polymerizable materials makes it possible to alter the physical properties of the polymers, and (4) the use of well-defined conditions of time, temperature, pressure, amounts of catalyst, etc., permits of the manufacture of resins with reproducible properties.

The soluble polymers of alpha, beta-unsaturated ketones prepared in the manner described above are adaptable to a wide variety of uses in the various arts. They are particularly useful in adhesive, coating, impregnating, and molding compositions.

ADHESIVE COMPOSITIONS CONTAINING ALPHA, BETA-UNSATURATED KETONES

The following examples illustrate the use of the polymers to which the present invention pertains in adhesive compositions.

*Example 12.*—Two pieces of leather were cemented together with a 50% solution of vinyl type methyl vinyl ketone polymer in acetone. After the solvent had evaporated the two pieces of leather adhered well, being stripped apart with difficulty.

*Example 13.*—Films of vinyl type methyl vinyl ketone polymer were flowed from an acetone solution on two pieces of window glass. A sheet of cellulose acetate was then placed between the two films, and placed in an oven with a weight on the glass sheet. The sandwich of safety glass was then cooled and cracked with a hammer. There was excellent adhesion as indicated by the fact that the glass did not shatter.

*Example 13A.*—Safety glass was prepared by flowing films of a solution composed of 25 parts of polymerized methyl vinyl ketone and 75 parts of ethyl acetate on two pieces of glass, allowing the film to dry for 24 hours, and then pressing the pieces of glass together so that the film formed the inner layer in a heated press. The resulting safety glass was extremely transparent and gave a good break and crush test.

*Example 14.*—A 4% solution of vinyl type methyl vinyl ketone polymer was prepared by dissolving the methyl vinyl ketone polymer in acetone, then diluting with butyl acetate. The ratio of acetone to butyl acetate was 1:3. This solution was sprayed on several glass plates, and sandwiches were prepared with sheets of nitrocellulose, making several pieces of safety glass. These plates were then pressed together in a hydraulic press heated to about 100° C. for about five minutes. The safety glass was clear and when broken it did not shatter, the broken glass continuing to adhere to the cellulose nitrate sheeting.

*Example 15.*—A 20% solution of vinyl type methyl vinyl ketone polymer in acetone brushed on pieces of moistureproof regenerated cellulose film caused these to adhere very well to one another.

*Example 16.*—An adhesive composed of 18% vinyl type methyl vinyl ketone resin, 8% diacetin, and 74% acetone was applied to a small square sheet of paper and allowed to dry. The stamp was then moistened with water and pasted on a piece of moistureproof regenerated cellulose film. It adhered much better than labels or stamps which were coated with a dextrin adhesive.

*Example 17.*—A 20% solution of vinyl type methyl vinyl ketone polymer in acetone was applied to a small piece of paper and allowed to dry. The adhesive was then moistened with water and the stamp applied to moistureproof regenerated cellulose film. The adhesion of this stamp was definitely superior to that obtained with the usual dextrin adhesive used on labels and the label was removed only with considerable difficulty.

*Example 18.*—A thin film of vinyl type methyl vinyl ketone polymer was deposited from an acetone solution upon a smooth piece of wood, another smooth piece of wood placed thereon and slight pressure applied. When sufficient time had elapsed to permit the solvent to evaporate it required considerable force to pull the two pieces of wood apart.

*Example 19.*—A thin film of vinyl type methyl vinyl ketone polymer was applied to a piece of cardboard, another piece of cardboard placed on top of the adhesive and slight pressure applied. When dry, the two pieces of cardboard adhered together so well that they could be pulled apart only by tearing off a thin layer of the cardboard.

*Example 20.*—A thin film of vinyl type methyl vinyl ketone polymer was deposited on a smooth piece of steel plate from an acetone solution and a piece of vulcanized rubber was placed over the adhesive and slight pressure applied until the film had dried. The rubber adhered very well to the metal surface and considerable force was required to remove it.

*Example 21.*—A film of vinyl type methyl vinyl ketone polymer was applied to a piece of stone and a smooth piece of metal placed thereon. Slight pressure was applied. When the film was dry the two could be separated only by means of considerable force.

In addition to adhesive compositions containing only the polymers of alpha, beta-unsaturated ketones, adhesive compositions may be made with mixtures or cross-polymers of alpha, beta-unsaturated ketones with cellulose organic esters, for example cellulose acetate or butyrate; cellulose inorganic esters, for example cellulose nitrate; and cellulose ethers, for example ethyl cellulose and benzyl cellulose; with natural resins or gums, for example dammar, Congo, kauri, rosin ester gum, shellac; with synthetic resins, for example phenol-formaldehyde, glyptal, urea-formaldehyde, vinyl resins; with the softeners or plasticizers, for example camphor, aryl phosphates, alkyl phthalates, aryl phthalates, glycerol, castor oil, and vaseline; with bituminous materials such as asphalts; with waxes, for example carnauba and paraffin; with tars and pitches; with raw, blown, or hydrogenated drying oils, semi-drying oils, non-drying oils, and mineral oils; with rubber and with proteins such as casein, glue, and gelatin. Suitable adhesive compositions may also be made from interpolymers of methyl vinyl ketone with other polymerizable materials; for example, vinyl acetate, vinyl chloride, styrene, and esters, and other derivatives of acrylic acid.

Examples 22 to 25 describe compositions which are particularly good when used with the moistureproof regenerated cellulose film described in U. S. Patent No. 1,737,187. These compositions are prepared by dissolving the vinyl ketone resin in a solvent or by converting the resin to a thermoplastic state.

Example 22

| | Per cent |
|---|---|
| Methyl vinyl ketone resin | 19.6 |
| Diethyl phthalate | 2.2 |
| Acetone | 78.2 |

This adhesive is unique in that it takes hold much more quickly than any other known adhesive for moistureproof regenerated cellulose film and at the same time accumulations of it on the fingers, work bench, etc. may easily be removed merely by rubbing.

Example 23

| | Per cent |
|---|---|
| Methyl vinyl ketone polymer | 11.8 |
| China-wood oil modified glyptal resin | 20.8 |
| Diethyl phthalate | 1.3 |
| Castor oil | 5.3 |
| Acetone | 60.8 |

The China-wood oil modified glyptal resin was prepared by heating together

| | Parts by weight |
|---|---|
| Glycerol | 14.62 |
| Phthalic anhydride | 20.68 |
| China-wood oil acids | 31.50 |
| Rosin at 200–250° C. until resinification took place | 33.20 |

Example 24

| | Per cent |
|---|---|
| Methyl vinyl ketone polymer | 13.7 |
| Nitrocellulose (8 seconds viscosity) | 4.5 |
| Diethyl phthalate | 1.8 |
| Acetone | 80.2 |

Another example using a natural gum and a more complex solvent mixture is

Example 25

| | Per cent |
|---|---|
| Methyl vinyl ketone polymer | 8.0 |
| Nitrocellulose (30 seconds viscosity) | 5.6 |
| Gum dammar | 4.8 |
| Ethanol | 2.3 |
| Dibutyl phthalate | 13.4 |
| Methoxy ethanol | 33.9 |
| Acetone | 32.0 |

The last four examples may be applied in the manner described in Examples 15, 16, and 17. Solutions of the type illustrated in these examples are of great utility where a narrow, colorless line is desired. Thermoplastic compositions, however, are more satisfactory than solutions when applied generally to regenerated cellulose film, since their use does not involve the necessity of removing the solvent after application. Alpha-beta unsaturated ketones form thermoplastic polymers which may be applied either from a melt or from solvent solution, the solvent being removed in the latter case prior to the actual lamination process.

As indicated in the last three examples, where the resin compositions are used for laminating moistureproof regenerated cellulose film with itself or with other material, the resin is preferably compounded with low boiling solvents, i. e., having a boiling point less than 130° C. with or without the addition of softeners. Natural and synthetic resins and cellulose derivatives, such as nitrocellulose and cellulose acetate may be added.

Adhesive compositions comprising the vinyl-type polymers of alpha, beta-unsaturated catalysts and particularly of methyl vinyl ketone are also of specific use in the manufacture of safety glass as illustrated in the Examples 13 and 14. They are also useful in the preparation of laminated paper products and laminated wood products. They may be employed on any type of material, e. g., metal, wood, stone, rubber, synthetic rubber, fabric, regenerated cellulose film, plastic compositions, felt, cork, and the like. They may be used as adhesives for causing wood, paper, cardboard, asbestos board, felt, cork, etc. to adhere to glass, metal, rubber, wood, regenerated cellulose film and the like.

The polymers of alpha, beta-unsaturated ketones and particularly of methyl vinyl ketone are soluble in various organic solvents and are therefore quite readily applied to various articles which it is desired to stick together. The marked solubility of the polymers makes them particularly useful in manufacturing adhesive compositions comprising other resins, cellulose derivatives, and plasticizers. Furthermore, the polymers are substantially unaffected by gasoline and other hydrocarbon solvents, they are quite noninflammable and are not decomposed by bacteria as are adhesives of the glue, gelatin, or casein type.

PLASTIC COMPOSITIONS CONTAINING POLYMERS OF ALPHA, BETA UNSATURATED KETONES

The following examples illustrate preferred forms of this phase of the invention:

Example 26

| | Parts by weight |
|---|---|
| Polymerized methyl vinyl ketone | 150 |
| Wood flour | 142.5 |
| Carbon black | 7.5 |

This molding composition was prepared by mixing an acetone solution of the resin in a heated Werner and Pfleiderer mixer with the wood flour and carbon black until all of the acetone was expelled from the mixture. The resulting product was a hard, tough, black, homogeneous mass which could be molded into the desired shape by the use of the ordinary molding appliances.

*Example 27.*—A solution consisting of equal parts of methyl vinyl ketone and acetone containing 1% benzoyl peroxide based on the methyl vinyl ketone was heated under a water-cooled reflux condenser for about ten hours. The solution of the polymer was then processed in a steam heated Werner and Pfleiderer mixer to remove the solvents. The product was colored a light brown and while the mixer was hot was sufficiently thermoplastic to permit the mixer to operate in a satisfactory manner. The resin was molded in a poker chip die, heated to about 120° C. and under a pressure of about 2000 lbs. per sq. in. The resin flowed exceptionally well and did not stick to the mold. The chip was hard and unusually strong. It was colored a light brown and was transparent. The chip was unaffected when soaked in gasoline. It burned when a lighted match was applied to it but when the match was removed the flame died out.

*Example 28.*—Methyl vinyl ketone polymer prepared as described in Example 27 was softened by warming on a steam table and then sheeted by milling on mechanically operated rolls. When a suitable sheet was formed, finely pulverized diatomaceous earth was slowly added and milled into the plastic. A composition representing 65 parts of methyl vinyl ketone polymer and 35 parts of diatomaceous earth was thereby formed. One-half per cent of aluminum palmitate based on the resin was added during the milling operation. When the composition was thoroughly mixed the filled plastic was rolled to sheets 8" square and about .125" thick. Phonograph records were molded from these sheets at a temperature of about 130° C. and under a pressure of 3000 lbs. per sq. in. Records possessing an excellent impression were obtained and the sound characteristics of the resin were superior to records made with shellac in that the records made with the methyl vinyl ketone polymer gave considerably less "needle noise".

*Example 29.*—A composition composed of the following:

| | Parts |
|---|---|
| Cellulose acetate | 20 |
| Methyl vinyl ketone | 130 |
| Acetone | 113 |
| Benzoyl peroxide | 2.3 | were heated in a reaction vessel under a water-cooled reflux condenser for about ten hours. The solution was processed in a steam heated Werner and Pfleiderer mixer to remove all of the solvents and the thermoplastic resin was removed from the mixer while still hot. Equal parts of the resin and a mineral filler, such as diatomaceous earth, were ground in a ball mill and the powder molded into a saucer. A temperature of about 110° C. and a pressure of about 3000 lbs. per sq. in. was used during the molding operation. When the die was soaped the saucer came out in a satisfactory manner. The plastic flowed well and took the impression of the die in a satisfactory manner. The saucer was strong and resistant to fracture.

*Example 30.*—A composition composed of:

| | Parts |
|---|---|
| Methyl vinyl ketone | 330 |
| Ethyl cellulose | 110 |
| Dibutyl phthalate | 66 |
| Acetone | 330 |
| Benzoyl peroxide | 3.3 | was refluxed with vigorous stirring for about ten hours. The solution was then processed in a steam heated Werner and Pfleiderer mixer to remove the solvents and the resin was removed while the mixer was still hot. Forty parts of the resin were milled on warm rolls with 60 parts of a mineral filler until a homogeneous plastic was obtained. Sheets were then rolled about 8" square and .125" thick and phonograph records were molded.

Records containing an excellent impression of the record matrix were obtained and the sound characteristics of the flexible record were superior to those of a brittle shellac record.

*Example 31.*—A solution of methyl vinyl ketone polymer in acetone was treated in a heated Werner and Pfleiderer mixer to remove most of the solvents. Ethyl acetate was then added, worked into the plastic and the mixture allowed to cool. Enough pyroxylin (containing a considerable quantity of alcohol) was added to make a 50/50 mixture of the methyl vinyl ketone resin and pyroxylin. Ethyl acetate was added along with the pyroxylin wet with alcohol to assist in colloiding the plastic composition. A portion of this plastic composition containing ethyl acetate and alcohol was heated in a steam heated oven to remove these solvents. Poker chips were molded from this material which flowed well in the mold. They were hard and tough and burned quite slowly when ignited. A quantity of this colloid was rolled on warm rolls to remove the major part of these solvents. After rolling, it was compressed at 160° F. for 30 minutes into a cubical cake. The cake was then sheeted into sheets .02" thick which were then used in making safety glass. In some cases an adhesive was used in making the sandwiches and in other cases no adhesive was used. All these sandwiches showed good resistance to shattering when hammered.

Plastic compositions may be made from mixtures of polymers and/or cross-polymers of methyl vinyl ketone with one or more of the following: cellulose derivatives including cellulose acetate, cellulose propionate, cellulose butyrate, cellulose nitrate, ethyl cellulose, benzyl cellulose; natural resins or gums, for example Congo, dammar, kauri, rosin, ester gum and shellac; synthetic resins, for example phenol-formaldehyde, polyhydric alcohol-polybasic acid, urea-formaldehyde, and vinyl resins; softeners or plasticizers, for example, camphor, aryl phosphates, alkyl phthalates, aryl phthalates, glycerol, castor oil, diethylene glycol, and vaseline; pigments, for example, lithopone, graphite, lamp black, iron oxide, zinc oxide, white lead, Titanox, and Prussian blue; bituminous material such as asphalt either blown or raw, tars and pitches; waxes like carnauba and paraffin; raw, blown, or hydrogenated oils, semi-drying oils, non-drying oils, mineral oils, with rubber, and with proteins, like casein glue, and gelatin.

Plastic compositions may also be prepared from cross polymers which result from polymerizing methyl vinyl ketone in the presence of the above mentioned substances. Suitable plastic compositions may also be made from inter-polymers of methyl vinyl ketone with other polymerizable materials such as vinyl acetate, vinyl chloride, styrene, and esters and other derivatives of acrylic acid and its homologs. Methyl vinyl ketone polymers alone or in conjunction with other resinous material may be readily modified by treatment with alkali or with formaldehyde, in which cases the methyl vinyl ketone polymers may be rendered insoluble and infusible. Chemical treatment of the methyl vinyl ketone polymers is important in that after the molding operation the articles may be suitably treated and rendered insoluble and infusible. Suitable fillers that may be used with the methyl vinyl ketone polymers are wood flour, ground cork and mineral fillers such as mica, whiting, aluminum powder, and diatomaceous earth. In addition to polymers of methyl vinyl ketone, polymers of other alpha, beta-unsaturated ketones may be used in practicing this invention. Examples of such unsaturated ketones are methyleneethyl methyl ketone, phenyl vinyl ketone, divinyl ketone, methyl-5-keto-3-pentadiene-4, mesityl oxide, methyl-4-keto-2-butene-3, and others.

Lubricants other than aluminum palmitate may be employed in the plastic compositions such as soaps, for example, aluminum stearate or zinc stearate, and waxes, for example, carnauba, paraffin, or hydrogenated castor oil.

The methyl vinyl ketone polymers and the modified methyl vinyl ketone polymers in conjunction with other resin forming materials may be used either alone or with fillers in the manufacture of molded articles. They may be used as glass substitutes or in the production of laminated products in which the methyl vinyl ketone polymers or the modified polymers serve as the binding interlayer for sheets of cellulose acetate, pyroxylin, mica, glass, etc. Two outstanding uses of the methyl vinyl ketone polymers are its use as both an interlayer and a binder for glass in the production of safety glass and in the plastic field in the production of phonograph records.

Polymers of methyl vinyl ketone made by the hydration of monovinyl acetylene, are soluble in many organic solvents and therefore are more readily incorporated with other resins and with fillers than the insoluble polymers described in the prior art. The marked solubility of polymers of alpha, beta-unsaturated ketones described in this invention is particularly useful in manufacturing plastic compositions comprising other resins, or cellulose derivatives, or plasticizers. Ready solubility in cheap solvents, such as acetone, also permits of economical compounding of plastic compositions. The polymers of methyl vinyl ketone are, however, particularly insoluble in gasoline and other hydrocarbons, a property which extends considerably the usefulness of molded articles made from them, for example molded parts to be used by the oil industry. The polymers of methyl vinyl ketone are also quite non-inflammable and burn with difficulty. Compositions comprising methyl vinyl ketone polymers are quite resistant to attack by ozone which renders them suitable for the manufacture of parts for electrical equipment.

COATING AND IMPREGNATING COMPOSITIONS INVOLVING THE USE OF POLYMERS OF ALPHA, BETA-UNSATURATED KETONES

The polymers of alpha, beta-unsaturated ketones have considerable utility for the impregnating and coating of various porous materials as illustrated in the following examples:

*Impregnation of crinkled kraft paper*

*Example 32.*—An impregnating composition was prepared by dissolving 4 parts by weight of the vinyl type polymer of methyl vinyl ketone in 96 parts by weight of acetone. These tests were made by completely immersing strips of crinkled kraft paper in the resinous solution until they were thoroughly wet which usually requires from 30 seconds to a minute. The impregnated strips were then removed and allowed to air dry. In this particular test using a 4% solution of polymerized methyl vinyl ketone, the paper absorbed 14% of its weight of methyl vinyl ketone polymer. The resulting dried paper was very tough and difficult to tear. Very satisfactory heat softenable box toes and counters for shoes can be made from this impregnated crinkled kraft paper.

Crinkled kraft paper is an example of a highly absorbent, porous, low density paper. This is prepared by forming sheets from cellulosic fibers which have been artificially crinkled by caustic alkali treatment.

IMPREGNATION OF PAPER WITH POLYMERIZED METHYL VINYL KETONE TO RENDER IT TRANSPARENT

*Example 33.*—An impregnating composition was prepared by dissolving 10 parts by weight of the vinyl type polymer of methyl vinyl ketone in 90 parts by weight of ethyl acetate. The vinyl type polymer of methyl vinyl ketone has an index of refraction of approximately 1.5 which makes this resin particularly useful as an impregnating agent for thin paper in the preparation of transparent paper. These tests were carried out by immersing sheets of unsized, thin, white paper in the solution of the polymer from 1 to 5 minutes. The strips of the paper were then removed from the solution and allowed to dry either by air drying or force drying in an oven at 100° C. The resulting impregnated strips of paper were quite transparent.

*Impregnation of cloth*

*Example 34.*—An impregnating composition was prepared by refluxing for five hours 50 g. of methyl vinyl ketone dissolved in 50 g. of ethyl acetate containing 1 g. of benzoyl peroxide. The solution was diluted with ethyl acetate to a concentration of 5% of resin. Cotton cloth was impregnated with this solution and allowed to dry. It possessed a linen appearance. With greater concentrations the cloth becomes stiff and loses its flexibility to a marked degree. The impregnated cotton cloth was laundered three times by washing with soap and water, and ironing. The material still possessed a linen appearance after these washings.

In this connection these vinyl ketone polymers may be used as an artificial starch. After one impregnation the garment may be laundered several times without the further addition of the polymer or starchy material.

*Oil proof containers*

*Example 35.*—Polymerized methyl vinyl ketone is extremely resistant to solvent action by hydrocarbons and therefore may be employed in protective coatings for paper oil containers, etc. The following coating composition was employed in treating paper containers for oil. Ninety grams of the vinyl type polymer of methyl vinyl ketone was dissolved in 45 g. of butyl acetate and 465 g. of ethyl acetate. The paper containers were dipped in the solution of resin so that the containers were entirely coated. The containers were inverted so that the excess resin solution on the inside of the container could drain out leaving an even coated surface. The resulting coated container was allowed to air dry for 10 minutes and then heated in an oven at 100° C. until all the solvent was removed. A second coat of resin was then applied in the same manner. Ordinary lubricating oil was stored in these coated containers for two weeks to a month without leaking while the uncoated containers failed in 30 minutes. Since the polymer is odorless, and tasteless these paper containers can be used as containers for edible hydrocarbon or fatty materials, such as butter, lard, oysters, hydrogenated oils, ice cream, etc.

Polymerized methyl vinyl ketone can also be used in coating and impregnating cloth containers.

A coating composition for cloth

*Example 36.*—A composition composed of 8 parts nitrocellulose, 5 parts of dibutyl phthalate, 18 parts of vinyl type methyl vinyl ketone polymer, 18 parts of pigment, and 51 parts of solvent is prepared in the following manner: The pigment for example Titanox, is dispersed by means of a ball mill grind in a portion of a solution of the methyl vinyl ketone polymer dissolved in an ester or a ketone. The remainder of the resin solution is added to this mill base and finally pyroxylin containing some alcohol and dibutyl phthalate is worked into the composition. A thick paste is then applied to stretched cloth by means of a spreader knife and a relatively thick coat is secured by four or five aplications. A flexible article is thus obtained which makes a satisfactory substitute for leather. The coating is quite resistant to gasoline and is less inflammable than a similar coating containing a higher content of nitrocellulose.

A coating and impregnating composition for leather

*Example 37.*—Polymerized methyl vinyl ketone can be applied either as a clear varnish or pigmented composition over leather surfaces. The following compositions have been employed; (1) Clear: 100 g. of vinyl type polymer of methyl vinyl ketone dissolved in 700 g. of butyl acetate; (2) Black enamel: 60 g. of vinyl type polymer of methyl vinyl ketone dissolved in 40 g. of butyl acetate and mixed with 10 g. of carbon black.

For use in coating and impregnating materials, the polymers are dissolved in appropriate solvents such as acetone, esters, cellosolve derivatives, etc. or mixtures thereof, or by polymerizing the alpha, beta-unsaturated catalysts in a solution of solvent or solvents. The resinous compositions may be applied by any of the common methods of applying coating compositions and impregnating agents to receptive surfaces, particularly of the non-rigid type, as by spraying, brushing, blowing, and the like.

The new compositions of matter derived from polymerized alpha, beta-unsaturated ketone can be utilized in a number of ways for coating and impregnating non-rigid materials. These polymers possess a number of properties such as transparency, toughness, plasticity, solubility, etc., which make them unique as impregnating and coating materials. The resulting treated products can be either air-dried or baked. Baking the products at 100° C. gives a slightly harder film than air drying. In examples 33 et seq. only the pure polymer of methyl vinyl ketone has been considered but interpolymers, cross-polymers (methyl vinyl ketone polymerized in the presence of polymerizable and unpolymerizable materials such as vinyl acetate, vinyl chloride, styrene, pyroxylin, rubber, and rosin) and mixtures of polymerized methyl vinyl ketone may also be employed as impregnating and coating compositions for non-rigid materials.

The compositions of matter disclosed in this application can be varied greatly, depending to a large extent on the objective of the treatments and the type of materials to be treated. The composition of the resin solution can be varied within wide limits. Concentration of polymer can be varied from 1% to 95% but is determined by the limits of the method of application. In most cases, concentrations of polymer above 50% are too viscous to be applied by spraying, brushing, dipping, etc.

The composition of the resin (polymerized methyl vinyl ketone) can be varied in a number of ways such as by polymerizing methyl vinyl ketone in the presence of a polymerizable or unpolymerizable material, and mixing polymerized methyl vinyl ketone with other resinous or non-resinous products. In the preparation of interpolymers or cross-polymers (polymerizing in the presence of a polymerizable or non-polymerizable material respectively) of methyl vinyl ketone with compounds such as vinyl acetate, vinyl chloride, styrene, rubber, cellulose acetate, dibutyl phthalate, etc. the compositions of the polymers may be varied within wide limits. The interpolymerization of methyl vinyl ketone with only two per cent of styrene definitely increases the softening temperature of the polymer. Similarly in the preparation of mixtures of polymerized methyl vinyl ketone with materials such as triglyceryl phthalate, cellulose nitrate, butyl lactate, p-toluenesulfonamide-formaldehyde resins, drying oils, natural and synthetic resins, etc., the composition of the mixtures may be varied within wide limits. The introduction of only 2% of polymerized methyl vinyl ketone in the cellulose nitrate and p-toluenesulfonamide-formaldehyde resins definitely increases the flexibility of the films.

Any of the ordinary methods of applying coating compositions and impregnating agents to non-rigid materials may be employed. Likewise any of the common methods of drying these products, such as by air-drying, baking, etc. can be used.

Methyl vinyl ketone polymer and its related polymers are exceptionally adapted to the following uses:

1. As an impregnating and coating composition for paper:
    (a) The tensile strength of crinkled kraft paper is increased many-fold by impregnation with polymerized methyl vinyl ketone.
    (b) Due to the combined refractive index obtained by treating thin layers of white paper with this polymer, the resulting product may be used as transparent wrapping material.
2. As an impregnating agent for cloth: The impregnation of cloth with polymerized methyl vinyl ketone greatly increases the tensile strength of the fiber and increases the body of the cloth sufficiently so that the polymer can be used as an artificial starch.

3. The impregnation and coating of leather.
The impregnation of leather with polymerized methyl vinyl ketone increases the tensile strength and elasticity of the leather. Coating leather with this polymer increases the gloss of the product.

4. In addition to these general uses a number of specific uses such as the coating of currency, airplane fabric, etc., may be cited.

The gasoline resistance, the reduced inflammability, and the ozone resistance of compositions comprising methyl vinyl ketone polymers enhance their value in the above applications.

The vinyl type polymers of alpha, beta-unsaturated ketones are soluble in various organic solvents and therefore are more readily applied to non-rigid articles which it is desired to coat or impregnate than the polymers described in the prior art. The marked solubility of vinyl type polymers of alpha, beta-unsaturated ketones is particularly useful in manufacturing coating and impregnating compositions comprising other resins, or cellulose derivatives, or plasticizers. Ready solubility in cheap solvents like acetone also permits of economical compounding of coating and impregnating compositions. Coating and impregnating compositions comprising vinyl type polymers of methyl vinyl ketone possess additional advantages in that these polymers are substantially unaffected by gasoline and other hydrocarbon solvents, that they are quite non-inflammable and are not readily attacked by ozone.

Methods for preparing methyl vinyl ketone and other alpha, beta-unsaturated ketones are well known in the art. A preferred method of preparing methyl vinyl ketone, however, consists in passing monovinyl acetylene (CH≡C—CH=CH$_2$) into an acidic aqueous solution of a mercury salt such as mercuric sulphate, mercuric acetate, etc., at an elevated temperature which is somewhat below the boiling point of water. Another method for preparing methyl vinyl ketone comprises adding one mole of monovinylacetylene to three moles of mercuric acetate, and hydrolyzing the resulting addition product by boiling in hydrochloric acid solution, methyl vinyl ketone being readily removed from the reaction mass by distillation.

The above description and specific examples are to be taken as illustrative only and not as limiting the scope of the invention. Any modification or variation therefrom which conforms to the spirit of the invention is intended to be included within the scope of the claims.

I claim:

1. An adhesive composition containing as an ingredient, a soluble polymer of an alpha, beta-unsaturated ketone.

2. The composition defined in claim 1 in which the ketone is methyl vinyl ketone.

3. An adhesive composition containing as an ingredient, a soluble polymer of an alpha, beta-unsaturated ketone dissolved in a solvent.

4. An article of manufacture which comprises two objects cemented together by a layer between them of a composition comprising a substantial amount of a polymer of methyl vinyl ketone, soluble in acetone and ester solvents.

5. An article of manufacture which comprises two objects cemented together by a layer between them of a composition comprising a substantial amount of a polymer of methyl vinyl ketone, soluble in acetone and ester solvents, one of the said two objects being a sheet of glass.

6. An article of manufacture which comprises two sheets of glass cemented together by a layer between them of a composition comprising a substantial amount of a polymer of methyl vinyl ketone, soluble in acetone and ester solvents.

ROLLIN F. CONAWAY.